US007213428B2

(12) United States Patent
Harada et al.

(10) Patent No.: US 7,213,428 B2
(45) Date of Patent: May 8, 2007

(54) APPARATUS FOR LOCKING AND UNLOCKING VEHICLE DOOR

(75) Inventors: Masahiko Harada, Miyazaki (JP); Hidetoshi Ijuin, Saitama (JP); Nobuyuki Kishikawa, Saitama (JP); Kozou Munezane, Saitama (JP); Naoki Katsumata, Saitama (JP)

(73) Assignees: Kabushiki Kaisha Honda Lock, Miyazaki (JP); Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/121,306

(22) Filed: May 3, 2005

(65) Prior Publication Data

US 2005/0253400 A1 Nov. 17, 2005

(30) Foreign Application Priority Data

May 10, 2004 (JP) ............................ 2004-139746

(51) Int. Cl.
*B60R 25/00* (2006.01)

(52) U.S. Cl. .................... 70/256; 70/237; 70/DIG. 42; 292/125; 292/199; 292/225

(58) Field of Classification Search ................. 70/464, 70/461, 466, 190, 191, DIG. 42, 257, 256, 70/237, 238; 292/144, 28, 39, 225, 112, 292/125, 51, 133, 160, 171, 172, 141, 142, 292/50, 199, 235; 74/409, 406, 395, 396
See application file for complete search history.

(56) References Cited

U.S. PATENT DOCUMENTS 1,892,446 A * 12/1932 Carr ............................. 70/81
2,202,422 A * 5/1940 Hoof ........................ 74/606 R
3,604,229 A * 9/1971 Wake .......................... 70/107
3,797,774 A * 3/1974 Dumbauld .................. 242/232
4,058,333 A * 11/1977 Roe et al. ................... 292/172

(Continued)

FOREIGN PATENT DOCUMENTS

JP 61-16383 5/1986

(Continued)

*Primary Examiner*—Lloyd A. Gall
(74) *Attorney, Agent, or Firm*—Carrier, Blackman & Associates, P.C.; William D. Blackman; Joseph P. Carrier

(57) ABSTRACT

An apparatus for locking and unlocking a vehicle door includes a cylinder lock having a rotor, a door lock mechanism including a key operation input shaft which rotates to switch a locked state and an unlocked state of a door, and a torque cable for transmitting rotation of the rotor to the key operation input shaft. One end of the torque cable is connected to the rotor via a gear transmission mechanism accommodated in a gear case. The gear transmission mechanism is constructed by a face gear coaxially connected to the rotor, and a pinion gear which has an axial line perpendicular to an axial line of the face gear, is connected to the torque cable, and is meshed with the face gear. The pinion gear is accommodated in the gear case to be capable of being displaced in an axial direction in a limited range while keeping a meshed state with the face gear. Therefore, even if a variation occurs to the mounting position of the cylinder lock and the door lock mechanism to the door, reduction in the ease of assembling the torque cable to the door lock mechanism can be avoided.

4 Claims, 13 Drawing Sheets

U.S. PATENT DOCUMENTS

| | | | | |
|---|---|---|---|---|
| 4,885,950 | A * | 12/1989 | Smith | 74/409 |
| 5,647,234 | A * | 7/1997 | Foster | 70/256 |
| 5,996,382 | A * | 12/1999 | Lehmkuhl | 70/256 |
| 2005/0167997 | A1 * | 8/2005 | Blight | 292/357 |

FOREIGN PATENT DOCUMENTS

| | | |
|---|---|---|
| JP | 02-030873 | 2/1990 |
| JP | 11-324426 | 11/1999 |

* cited by examiner

APPARATUS FOR LOCKING AND UNLOCKING VEHICLE DOOR

RELATED APPLICATION DATA

Japanese priority application No. 2004-139746, upon which the present application is based, is hereby incorporated in its entirety herein by reference.

BACKGROUND OF THE INVENTION

1. Field of the Invention

The present invention relates to an apparatus for locking and unlocking a vehicle door, comprising a cylinder lock in which a rotor which rotates in response to a key operation is rotatably supported at a cylinder body, a door lock mechanism including a key operation input shaft which rotates to switch a locked state and an unlocked state of a door, and a torque cable for transmitting rotation of the rotor to the key operation input shaft, in which one end of the torque cable is connected to the rotor via a gear transmission mechanism accommodated in a gear case mounted to the cylinder body.

2. Description of the Related Art

Conventionally, the apparatus using the torque cable as means for transmitting the rotating force of the rotor of the cylinder lock to the key operation input shaft of the door lock mechanism in order to bring the door lock mechanism into an unlocked state in response to the key operation of the cylinder lock is known by U.S. Pat. No. 5,996,382, for example. In this apparatus, a second bevel gear fixed to one end of the torque cable is meshed with a first bevel gear coaxially connected to the rotor, whereby the torque cable makes a twisting operation in response to the rotation of the rotor.

When a variation occurs to the mounting position of the cylinder lock and the door lock mechanism to the door, there arises a possibility of lowering the ease of assembling the torque cable to the door lock mechanism due to excess or insufficiency of the torque cable.

In the above-described conventional apparatus, the torque cable is placed to have bending, and therefore some of the aforementioned variation is considered to be absorbed, but when the torque cable is placed linearly without having bending, or when the torque cable is guided by a guide member which cannot be bent, there is a possibility that the ease of assembling the torque cable to the door lock mechanism is lowered due to the variation.

SUMMARY OF THE INVENTION

The present invention is made in view of the above circumstances, and has an object to provide an apparatus for locking and unlocking a vehicle door which is capable of avoiding reduction in the ease of assembling a torque cable to a door lock mechanism, even if a variation occurs to the mounting position of the cylinder lock and the door lock mechanism to the door.

In order to achieve the above-mentioned object, according to a first feature of the invention, there is provided an apparatus for locking and unlocking a vehicle door, comprising a cylinder lock in which a rotor which rotates in response to a key operation is rotatably supported at a cylinder body, a door lock mechanism including a key operation input shaft which rotates to switch a locked state and an unlocked state of a door, and a torque cable for transmitting rotation of the rotor to the key operation input shaft, in which one end of the torque cable is connected to the rotor via a gear transmission mechanism accommodated in a gear case mounted to the cylinder body, wherein the gear transmission mechanism is constructed by a face gear coaxially connected to the rotor, and a pinion gear which has an axial line perpendicular to an axial line of the face gear, is connected to the torque cable, and is meshed with the face gear, and wherein the pinion gear is accommodated in the gear case to be capable of being displaced in an axial direction in a limited range while keeping a meshed state with the face gear.

With the first feature, the gear transmission mechanism interposed between the rotor and the torque cable to transmit the rotating motion of the rotor to the torque cable is constructed by the face gear coaxially connected to the rotor, and the pinion gear which has the axial line perpendicular to the axial line of the face gear and is meshed with the face gear, and the pinion gear is capable of being displaced in the axial direction in the limited range while keeping the meshed state with the face gear. Therefore, even if a variation occurs to the mounting position of the cylinder lock and the door lock mechanism to the door, it is possible to absorb the variation by the displacement in the axial direction of the pinion gear, and the ease of assembling of the torque cable to the door lock mechanism can be enhanced with the length of the torque cable between the cylinder lock and the door lock mechanism substantially fixed at all times.

According to a second feature of the present invention, in addition to the first feature, a fitting recessed part in which the rotor is fitted to be incapable of relatively rotating is provided at a central part of the face gear, and a projection projecting to the side of the rotor is projectingly provided at a closed end of the fitting recessed part with its surface in a curved surface shape.

With this feature, even in the state in which the gear case is disengaged from the cylinder body and the connection of the face gear and the rotor is released, the projection part is placed in the fitting recessed part at the central part of the face gear. Therefore, it is difficult to insert a tool or the like into the fitting recessed part, and it is difficult to hold the projection part because the surface of the projection part is in a curved surface shape. Accordingly, it is difficult to operate the face gear to rotate undesirably, thereby enhancing an anti-theft effect.

The above-mentioned object, other objects, characteristics, and advantages of the present invention will become apparent from an explanation of a preferred embodiment, which will be described in detail below by reference to the attached drawings.

BRIEF DESCRIPTION OF THE DRAWINGS

FIG. 1 is a side view of a vehicle door.

FIG. 2 is a perspective view showing a connected state of a cylinder lock and a door lock mechanism.

FIG. 3 is a view showing one part of a handle case from a rear side.

FIG. 4 is a sectional view taken on line 4—4 in FIG. 3.

FIG. 5 is an exploded perspective view of the cylinder lock and a gear case.

FIG. 6 is a sectional view taken on line 6—6 in FIG. 4.

FIG. 7 is a partially cutout front view of the door lock mechanism showing a connecting portion by cutting out the torque cable.

FIG. 8 is a view of a part of an inside of a housing case of a door lock mechanism seen in the arrow direction of line 8—8 in FIG. 7.

FIG. 9 is a sectional view taken on line 9—9 in FIG. 7.

FIG. 10 is a perspective view showing a connecting part of the torque cable to the door lock mechanism by exploding it.

FIG. 11 is a sectional view corresponding to FIG. 9 in a state before the torque cable is connected to the door lock mechanism.

FIG. 12 is a perspective view showing a state when the insertion inhibiting member is mounted to the casing.

FIG. 13 is a perspective view corresponding to FIG. 12 for showing a state of an insertion inhibiting member in the state in which the engaging cylindrical part is disengaged from the fitting cylindrical part.

DESCRIPTION OF THE PREFERRED EMBODIMENT

Figure 1:
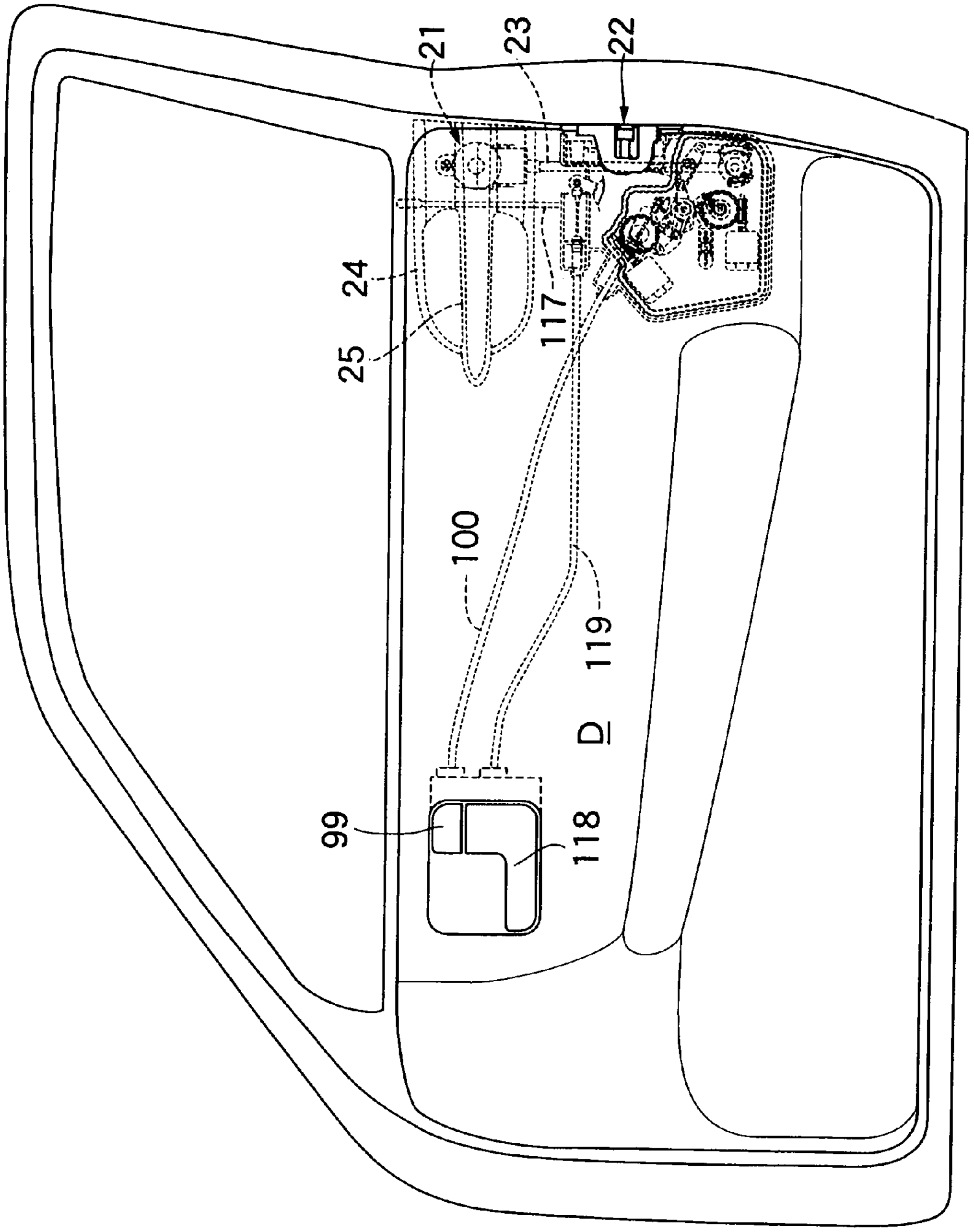
FIGS. 1 to 13 show one embodiment of the present invention.
Figure 2:
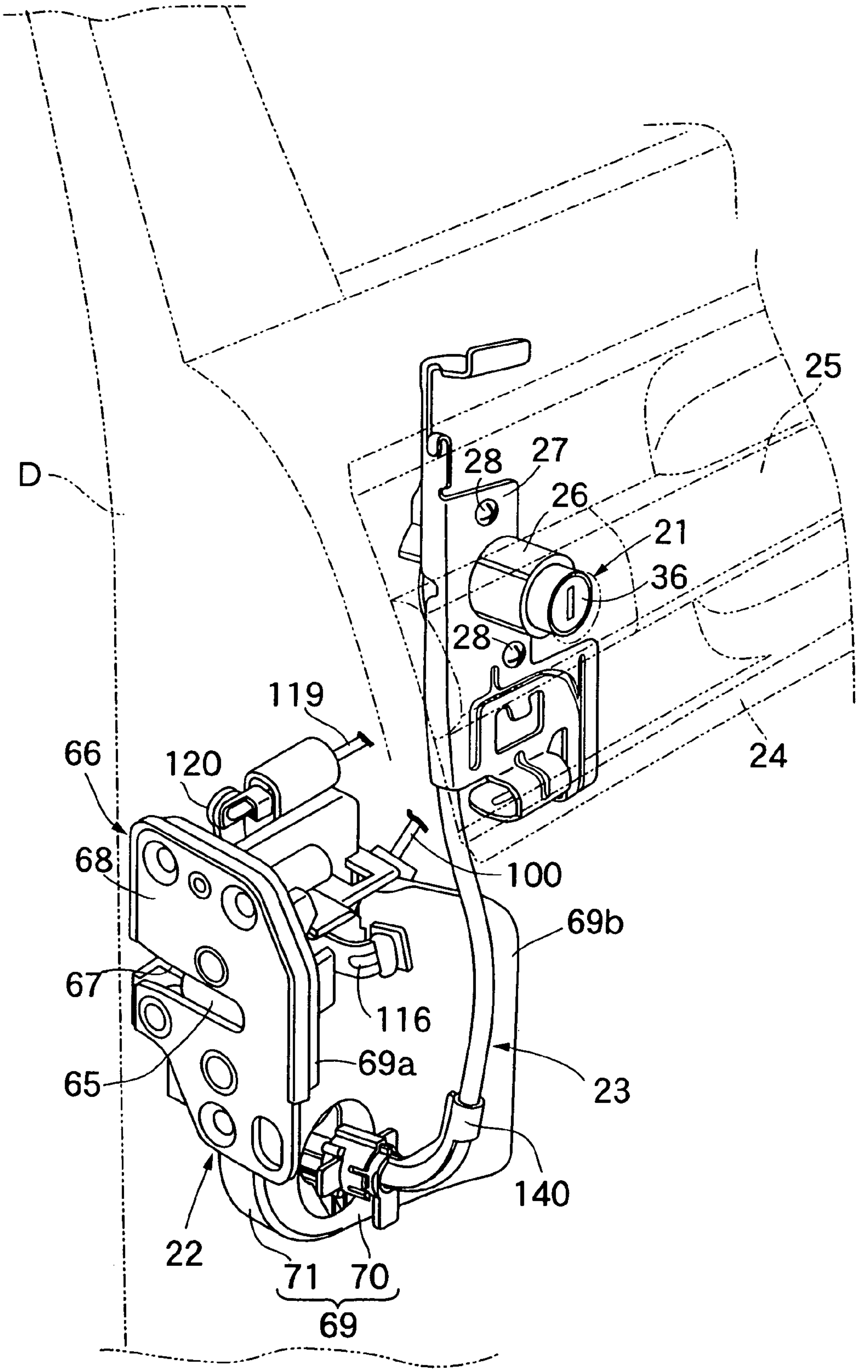

One example of the present invention will be described below with reference to FIGS. 1 to 13. First, in FIGS. 1 and 2, a right side door D in a passenger vehicle, for example, is provided with a cylinder lock 21 and a door lock mechanism 22 for switching a locked state and an unlocked state of the door D corresponding to a key operation of the cylinder lock 21. A rotating force as a result of the key operation of the cylinder lock 21 is transmitted to the door lock mechanism 22 via a torque cable 23.

Figure 3:
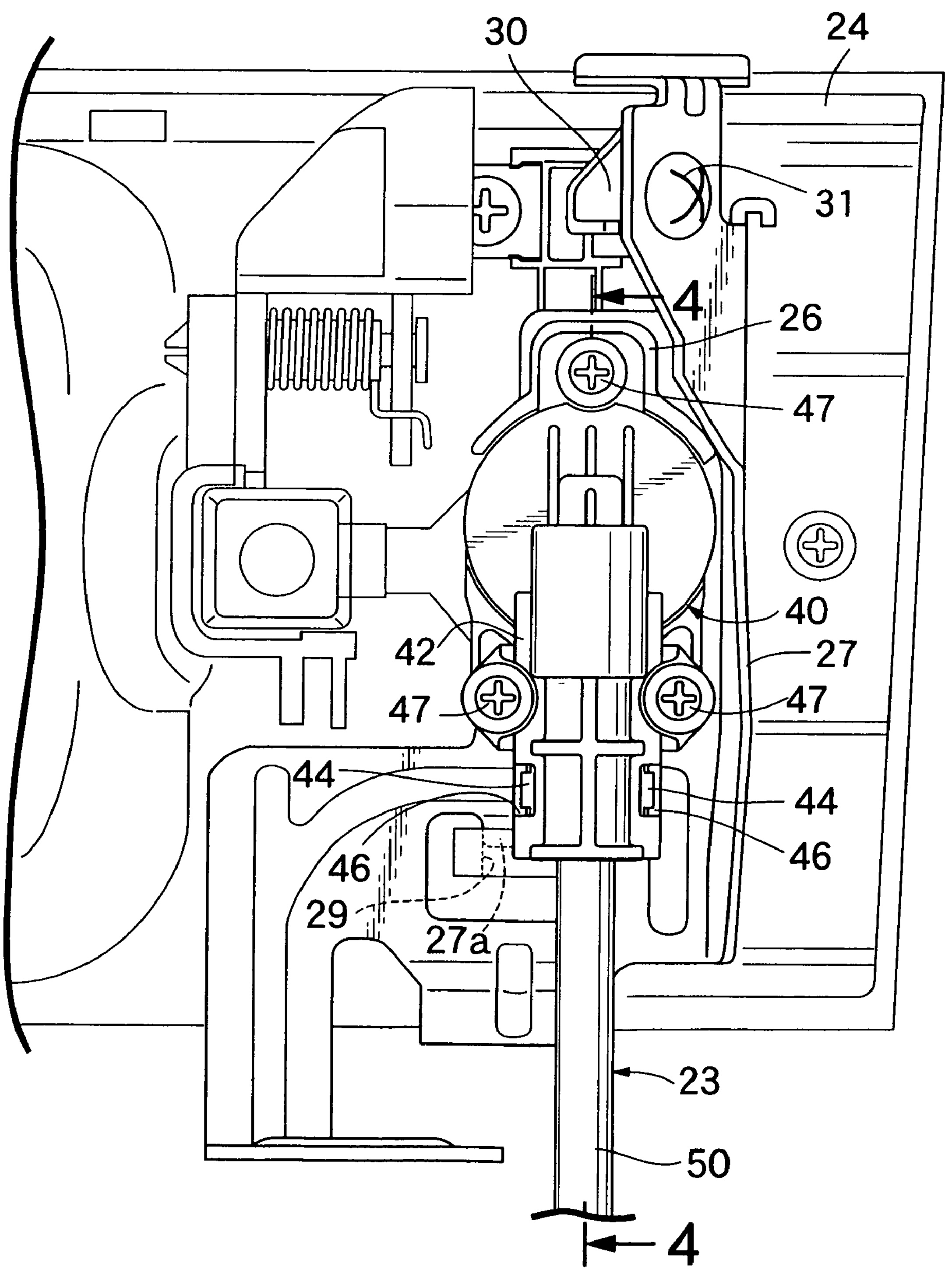
Figure 4:
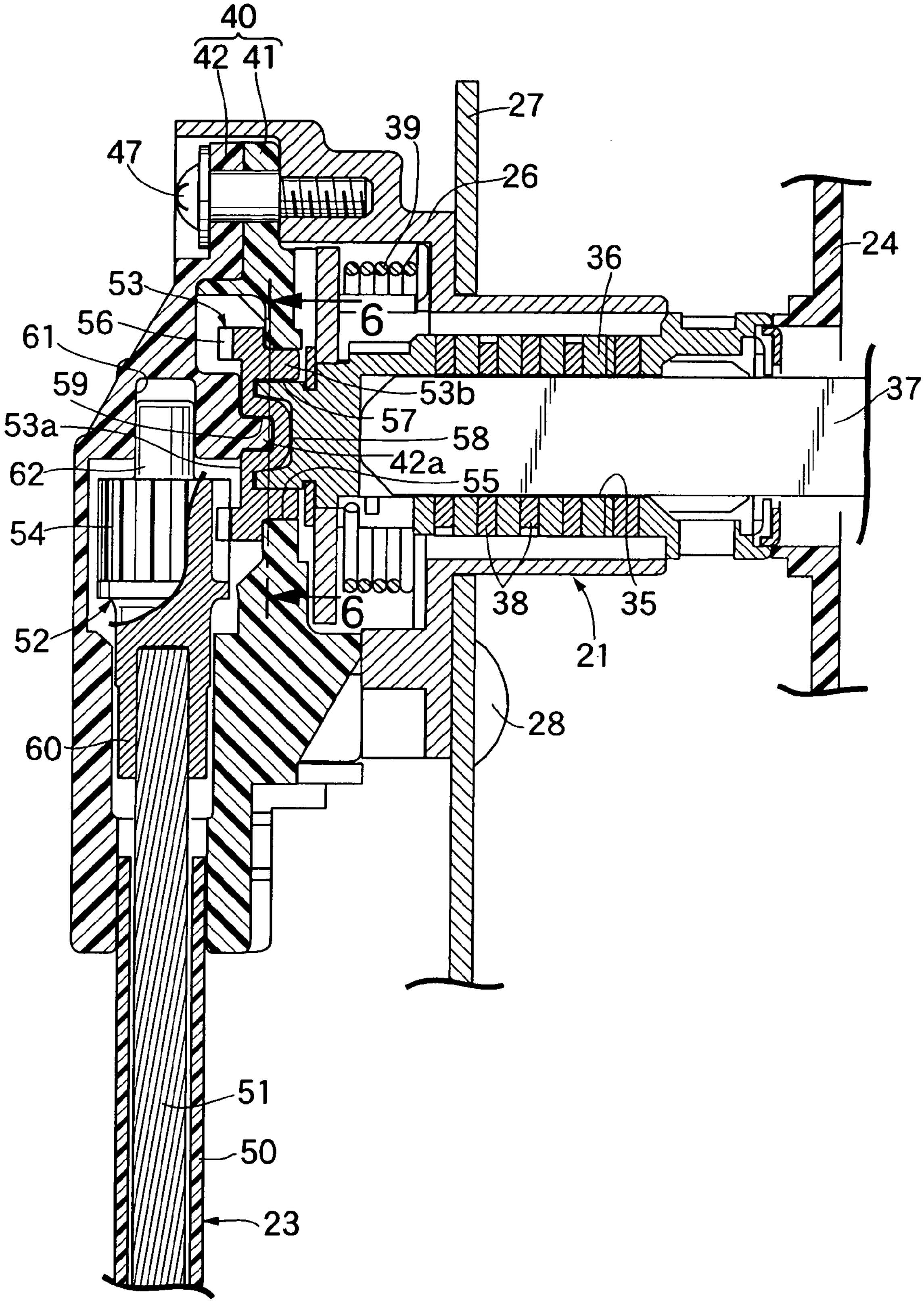

Referring also to FIGS. 3 and 4, a handle case 24 is mounted on an outer surface side of the door D, and an outside handle 25 is rotatably mounted to the handle case 24. A cylinder body 26 is mounted to a metal protector 27 with a pair of screw members 28, and an engaging projection part 27*a* capable of engaging with an engaging hole 29 provided at an inner surface side of the handle case 24 is provided to project at a lower portion of the protector 27. A metal support plate 30 is mounted to the inner surface side of the handle case 24, and an upper portion of the protector 27 is fastened to the support plate 30 with a screw member 31 with the engaging projection part 27*a* engaging with the engaging hole 29. Therefore, the cylinder body 26 of the cylinder lock 21 is mounted to the handle case 24 so as to coaxially correspond to an opening 32 provided in the handle case 24 in its inner side.

A rotor 36 having a key hole 35 is rotatably inserted into the cylinder body 26, and a plurality of tumblers 38 of which engagement with the cylinder body 26 is released by inserting a regular key 37 into the key hole 35 are placed at a plurality of locations spaced in an axial direction of the rotor 36. A return spring 39 for returning the rotor 36 to a neutral position is provided between the rotor 36 and the cylinder body 26.

When the regular key 37 is inserted into the key hole 35 and thereby, the rotor 36 is rotated, for example, 70 degrees in the clockwise direction from its neutral position, the door lock mechanism 22 in the unlocked state is switched to the locked state, and when the operating force applied to the key 37 is released, the rotor 36 returns to the neutral position. When the regular key 37 is inserted into the key hole 35, and thereby, the rotor 36 is rotated, for example, 70 degrees in the counterclockwise direction from its neutral position, the door lock mechanism 22 in the locked state is switched to the unlocked state, and when the operating force applied to the key 37 is released, the rotor 36 returns to the neutral position.

Figure 5:
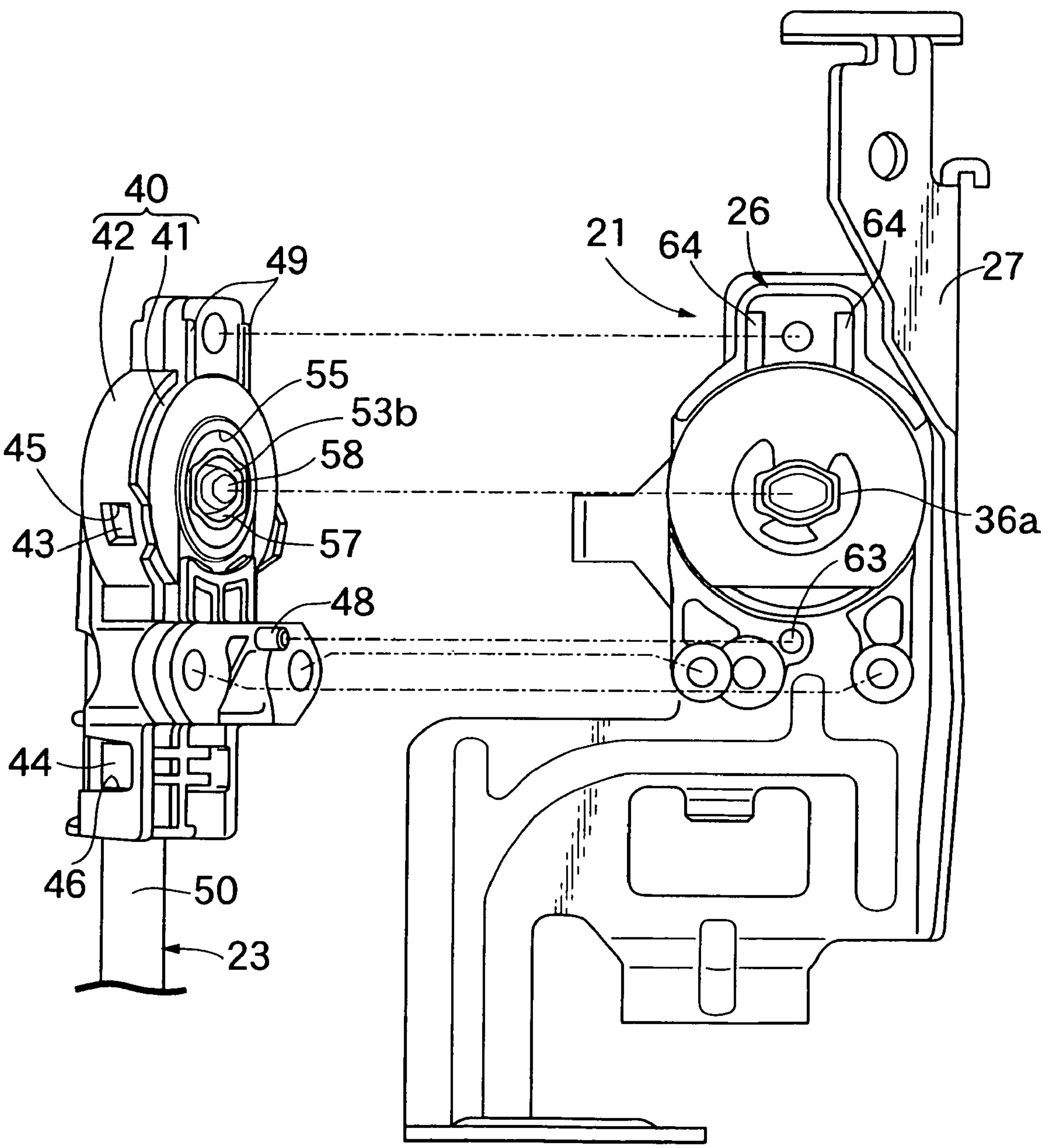

Referring also to FIG. 5, a gear case 40 is mounted to a rear portion of the cylinder body 26. This gear case 40 is constituted of a first case half piece 41 made of a synthetic resin, and a second case half piece 42 made of a synthetic resin in which a part of the first case half piece 41 is fitted. The first and second case half pieces 41 and 42 are connected to each other by engaging projections 43 and 44 a pair of which are provided to protrude at each of opposite sides of the first case half piece 41 engaging with locking holes 45 and 46 a pair of which are provided at each of opposite sides of the second case half piece 42.

The first and second case half pieces 41 and 42 connected to each other are placed so that the first case half piece 41 is sandwiched between the second case half piece 42 and the cylinder body 26, and are fastened to the cylinder body 26 with three screw members 47. The first case half piece 41 is integrally provided with one positioning pin 48 and a pair of positioning projecting ridges 49 and 49 extending upward and downward, and the cylinder body 26 is provided with a positioning hole 63 in which the positioning pin 48 is fitted, and positioning grooves 64 and 64 in which both the positioning projecting ridges 49 and 49 are fitted. The position of the gear case 40 with respect to the cylinder body 26 is fixed by fitting the positioning pin 48 into the positioning hole 63 and fitting both the positioning ridges 49 and 49 into the positioning grooves 64 and 64.

The torque cable 23 is formed by inserting an inner cable 51 into an outer casing 50 of which one end portion is connected to the gear case 40, and one end of the inner cable 51 projecting from one end of the outer casing 50 is connected to the rotor 36 via a gear transmission mechanism 52 which is accommodated in the gear case 40.

The outer casing 50 and the inner cable 51 are placed to extend downward from the gear case 40 with their one end portions perpendicular to the axial line of the rotor 36, and the one end portion of the outer casing 50 is sandwiched between the first and second case half pieces 41 and 42 at the lower portion of the gear case 40.

The gear transmission mechanism 52 transmits the rotating motion of the rotor 36 by converting it into the twisting motion of the inner cable 51, and is constructed by a face gear 53 coaxially connected to the rotor 36 and a pinion gear 54 which is fixed to one end portion of the inner cable 51 and is meshed with the face gear 53.

The first case half piece 41 in the gear case 40 is provided with a through-hole 55 coaxial with the rotor 36, and the face gear 53 is constituted of a circular plate part 53*a* provided with a number of tooth portions 56 on an entire surface of an outer peripheral portion, and a support cylindrical part 53*b* which is integrally connected to a central portion of one surface of the circular part 53*a* and is fitted into the through-hole 55.

Figure 6:
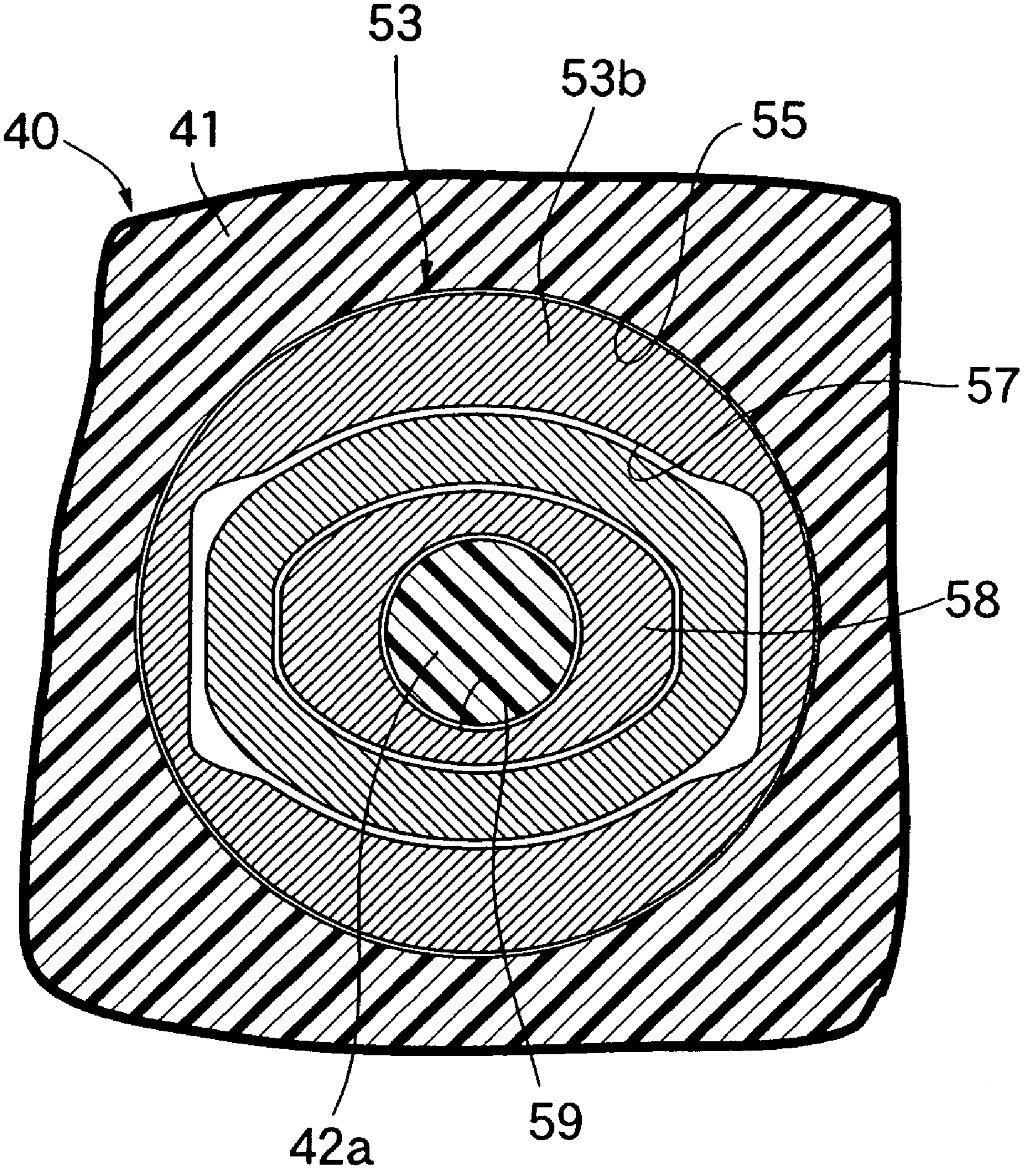

Referring also to FIG. 6, the support cylindrical part 53*b* of the face gear 53 forms a fitting recessed part 57 facing the rotor 36 side, and a projection part 58 projecting toward the rotor 36 is integrally provided to project at a closed end of this fitting recessed part 57 to form a support recessed part 59 at a back side of the projection part 58. Thus, one surface of the circular plate part 53*a* is in sliding contact with and supported by an inner surface of the first case half piece 41 around the support cylindrical part 53*b*, and a support shaft part 42*a* which is fitted in the support recessed part 59 is integrally provided to project at the second case half piece 42.

The fitting recessed part 57 is formed to have its section perpendicular to its axis formed to be in non-circular shape, and the fitting recessed part 57 is formed to have a substantially elliptic section perpendicular to the axis in this embodiment. The projection part 58 is also formed so that its section perpendicular to the axis becomes an elliptic shape substantially corresponding to the fitting recessed part 57, and the surface of the projection part 58 is formed to be a curved surface.

A connecting shaft part 36*a* is coaxially and integrally provided to project at a rear end of the rotor 36, and the shape of the section perpendicular to the axis of the connecting shaft part 36*a* is formed to have a substantially elliptic shape of the section perpendicular to the axis so that the connecting shaft part 36*a* is fitted in the fitting recessed part 57 to be incapable of relatively rotating, and that the projection part 58 is fitted into the connecting shaft part 36*a*.

The pinion gear 54 is integrally provided at a cable end 60 which is fixed to one end portion of the inner cable 51 by crimping or the like, and at the cable end 60, a shaft part 62 which is fitted into a bottomed support hole 61 provided in the second case half piece 42 in the gear case 40 is also provided coaxially and integrally with the pinion gear 54. In addition, the pinion gear 54 is accommodated in the gear case 40 while maintaining the state meshed with the face gear 53 and allowing the displacement in the axial direction in the limited range, and the shaft part 62 is slidably fitted into the support hole 61.

According to a construction of the above gear case 40 and gear transmission mechanism 52, the gear case 40 is mounted to the cylinder body 26 which is in the state mounted to the protector 27, whereby the face gear 53 of the gear transmission mechanism 52 is connected to the connecting shaft part 36*a* of the rotor 36 supported by the cylinder body 26 to be incapable of relatively rotating, and the gear transmission mechanism 52 converts the rotating force corresponding to the rotor 36 of the cylinder lock 21 rotating by the key operation into the twisting movement of the inner cable 51 in the torque cable 23. Thus, after the gear case 40 is mounted to the cylinder body 26, the protector 27 is mounted to the handle case 24.

Referring to FIG. 2 again, a casing 66 of the door lock mechanism 22 is provided with an admission groove 67 which a striker (not shown) at the side of a vehicle body is capable of entering, and the door D is locked in the closed state by inhibiting rotation of a latch 65 which is rotatably supported at the casing 66 to engage with the striker entering the admission groove 67 and rotate when the door D is closed. The door D is released from the locked state and brought into the unlocked state by allowing the rotation of the latch 65, and in this unlocked state, the door D can be opened.

Figure 7:
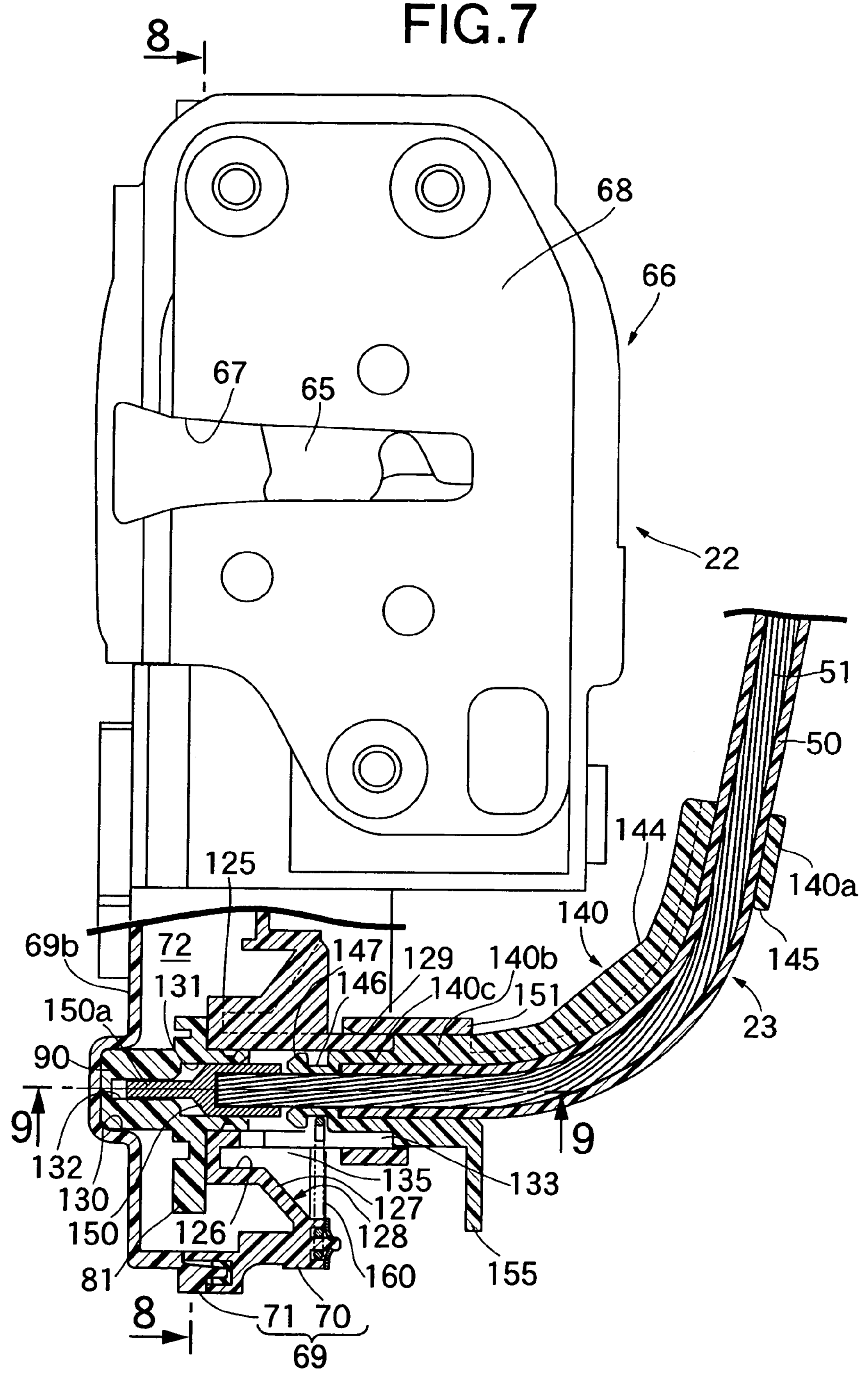

Referring also to FIG. 7, the casing 66 is constituted of a metal casing body 68 provided with the admission groove 67, and a housing case 69 which covers the casing body 68, and the housing case 69 is constructed by connecting a pair of case half pieces 70 and 71 made of a synthetic resin to each other.

The housing case 69 is formed into a substantially L-shape to construct a cover part 69*a* which is formed into a box shape with a side of the casing body 68 opened and covers the casing body 68, and a case main part 69*b* raised from the cover part 69*a*, and an operation chamber 72 is formed in the case main body 69*b*.

Figure 8:
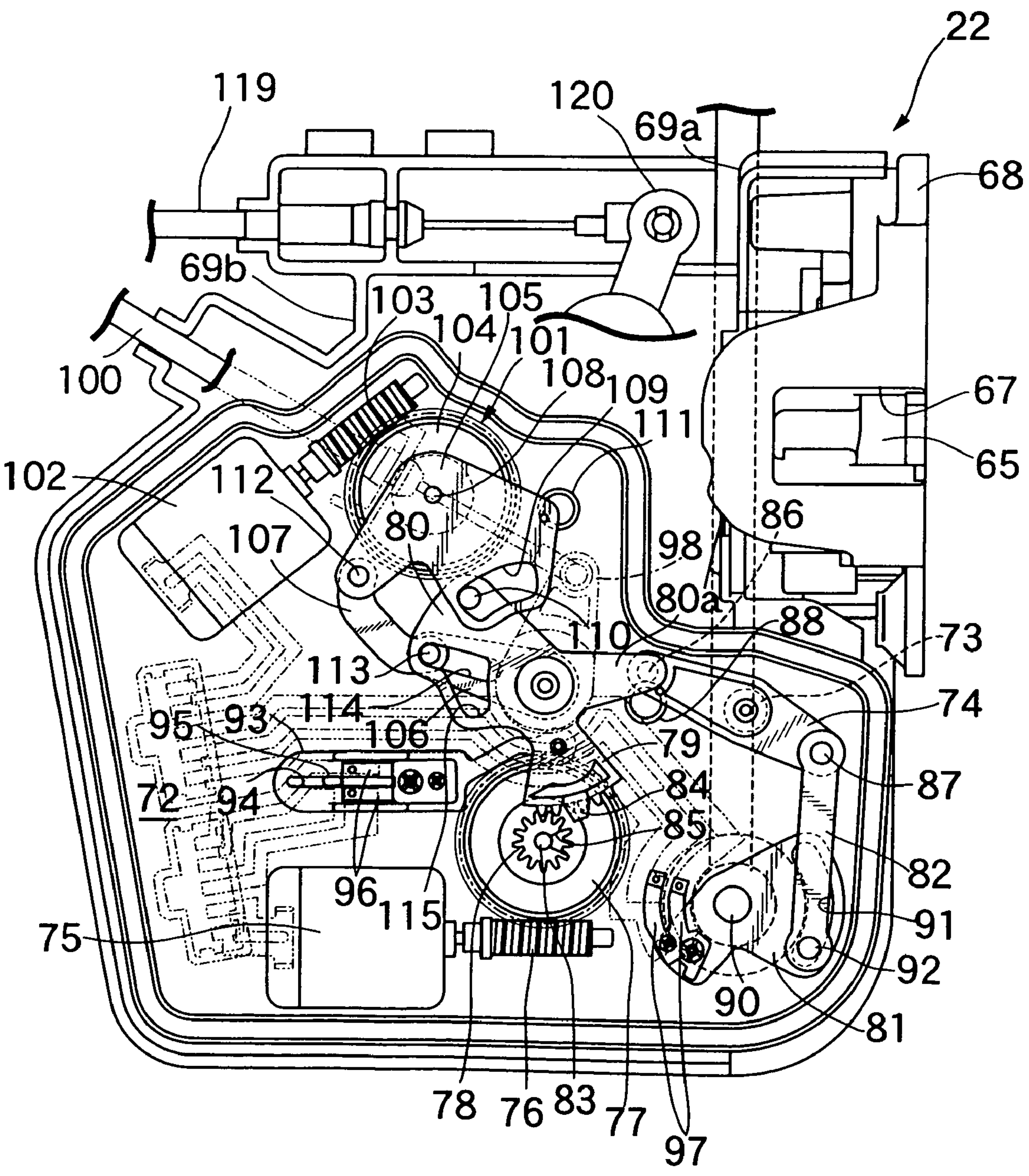

In FIG. 8, a door lock motor 75, a worm 76 which is coaxially connected to an output shaft of the door lock motor 75, a worm wheel 77 which is meshed with the worm 76, a gear 78 which is coaxially connected to the worm wheel 77 to be relatively rotatable with the worm wheel 77 in the limited range, a drive member 80 integrally having a sector gear 79 which is meshed with the gear 78, a door lock lever 74 of which one end portion is connected to the drive member 80, a key operation input lever 81, and a first link 82 which is provided between the other end portion of the door lock lever 74 and the key operation input lever 81 are accommodated in the operation chamber 72.

The door lock lever 74 is fixed to a door lock lever shaft 73 which has the axial line parallel to the direction in which the admission groove 67 extends and is rotatably supported at the case main part 69*b*. Thus, the locked state and the unlocked state of the door lock mechanism 22 can be switched by the door lock lever 74, namely, the door lock lever shaft 73 rotating between the locked position and the unlocked position.

The door lock motor 75 is rotatable in the normal and reverse directions, has an axis of rotation which is parallel to a plane perpendicular to the axial line of the door lock lever shaft 73, and is fixedly accommodated in the case main part 69*b*. The worm wheel 77 and the gear 78 are rotatably supported by a support shaft 83 which has the axial line that is parallel to the door lock lever shaft 73 and is supported by the case main part 69*b*. In addition, a spring not shown is provided between the worm wheel 77 and the case main part 69*b*, and the spring works to return the worm wheel 77 to the position before the rotation in both the normal and reverse direction when the operation of the door lock motor 75 is stopped. The drive member 80 is supported by the case main part 69*b* to be rotatable around the axial line which is parallel to the door lock lever shaft 73.

In order to fix the relative position at the time of assembling the sector gear 79 and the gear 78, the sector gear 79 is provided with a positioning projection 84 projecting to the side of the gear 78, and the gear 78 is provided with a positioning recessed part 85 in which the positioning projection 84 is capable of being fitted.

An arm part 80*a* which extends to one end of the door lock lever 74 is integrally provided at the drive member 80, and a tip end portion of the arm part 80*a* is connected to the one end portion of the door lock lever 74 via a connecting shaft 86. One end portion of the first link 82 is connected to the other end portion of the door lock lever 74 via a connecting shaft 87. A click spring 88 for moderately rotating the door lock lever 74 between the unlocked position shown in FIG. 8 and the locked position rotated in the counterclockwise direction in FIG. 8 from the unlocked position is provided between the door lock lever 74 and the case main part 69*b*.

The key operation input lever 81 is formed into a sector shape, and a key operation input shaft 90 which has an axial line parallel to the door lock lever shaft 73 and is rotatably supported by the case main part 69*b* is integrally provided at the key operation input lever 81 at the position corresponding to a pivot portion of the sector shape, and the rotating force corresponding to the key operation of the cylinder lock 21 is inputted to this key operation input shaft 90 via the torque cable 23. A long hole 91 in a circular arc shape with an axis of the key operation input shaft 90 as a center is provided in the key operation input lever 81, and an engaging pin 92 which is provided at the other end portion of the first link 82 is inserted through the long hole 91.

Thus, when the cylinder lock 21 is operated by a key to the unlocked side, the key operation input lever 81 rotates in the clockwise direction in FIG. 8, and the key operation input lever 81 engages with the engaging pin 92 at one end side of the long hole 91, thereby rotating the door lock lever 74 in the clockwise direction in FIG. 8 via the first link 82. The key operation input lever 81 returns to a neutral position by the rotation to the side to eliminate twist of the torque cable 23 corresponding to release of the operating force to the unlocked position side at the cylinder lock 21 as shown in FIG. 8. In this case, the door lock lever shaft 73 and the door lock lever 74 remain at the unlocked position without the key operation input lever 81 exerting a force onto the first link 82 at the other end side of the long hole 91. The drive member 80, namely, the sector gear 79 and the gear 78 also rotate in response to the rotation of the door lock lever 74, but the gear 79 in this case rotates without exerting the rotating force onto the worm wheel 77.

Next, when the cylinder lock 21 is operated by the key to the locked position, the key operation input lever 81 rotates in the counterclockwise direction from the neutral position in FIG. 8, and the key operation input lever 81 engages with the engaging pin 92 at the other end side of the long hole 91, thereby rotating the door lock lever 74 in the counterclockwise direction in FIG. 8 via the first link 82. Also at this time, the key operation input lever 81 returns to the neutral position shown in FIG. 8 by the rotation of the torque cable 23 to the side to eliminate twist corresponding to the release of the operating force to the locked position side at the cylinder lock 21, and the door lock lever shaft 73 remains in the locked position.

When the locked state and the unlocked state of the door lock mechanism 22 is switched by the operation of the door lock motor 75, the power from the door lock motor 75 is transmitted to the door lock lever 74 via the worm 76, the worm wheel 77, the gear 78 and the sector gear 79 of the drive member 80, and the door lock lever 74 rotates between the unlocked position and the locked position. However, the engaging pin 92 at the other end part of the first link 82 in this case only moves inside the long hole 91 of the key operation input lever 81, and the power is not transmitted to the key operation input lever 81 via the first link 82 from the door lock lever 74.

One end of a slide plate 93 is connected to the sector gear 79 of the drive member 80. The slide plate 93 is formed of a synthetic resin so as to extend along a plane perpendicular to an axis of rotation of the sector gear 79, and is in sliding contact with an inner surface of the case main part 69*b*. In addition, the slide plate 93 is provided with a long hole 94 which extends along its longitudinal direction, and a pin 95 provided at the case main part 69*b* is inserted through the long hole 94, whereby the slide plate 93 is guided to move along its longitudinal direction.

A pair of movable contacts 96 conducting to each other are fixed to the slide plate 93, and conduction/shutoff of a plurality of fixed contacts which are fixed to the case main part 69*b* as shown by the chain line in FIG. 8 and both the movable contacts 96 is switched by the slide operation of the slide plate 93, namely, the rotation of the sector gear 79, the door lock lever shaft 73 and the door lock lever 74, whereby the locked position and the unlocked position of the door lock lever shaft 73 and the door lock lever 74 are detected.

A pair of movable contacts 97 conducting to each other are fixed to the key operation input lever 81, and the fact that the key operation input lever 81 is rotated into the locked position and the unlocked position, namely, the fact that the locking/unlocking operation by the cylinder lock 21 is performed, is detected by conduction/shutoff of the fixed contacts fixed to the case main part 69*b* as shown by the chain line in FIG. 8 and both the movable contacts 97.

A knob lever 98 of which axis of rotation is coaxial with the drive member 80 is placed at the case main part 69*b* to allow relative rotation with the drive member 80, an operating force when a lock operation knob 99 (see FIG. 1) is operated at a vehicle compartment side to switch the locked state and the unlocked state of the door lock mechanism 22 is inputted to the knob lever 98 via a push/pull cable 100.

When the lock operation knob 99 is operated to the locked side, the knob lever 98 rotates in the clockwise direction in FIG. 8, and when the lock operation knob 99 is operated to the unlocked side, the knob lever 98 rotates in the reverse direction and is in the position shown in FIG. 8.

A super lock mechanism 101 which is capable of switching connection and disconnection of the lock operation knob 99 and the drive member 80 is interposed between the lock operation knob 99 and the drive member 80.

The super lock mechanism 101 includes a super lock motor 102, a worm 103 coaxially connected to an output shaft of the super lock motor 102, a worm wheel 104 which has an axial line parallel to the axis of rotation of the drive member 80 and is meshed with the worm 103, a super lock lever 105 which is coaxially connected to the worm wheel 104 to be capable of relative rotation with the worm wheel 104 in a limited range, a guide lever 106 which is coaxially connected to the knob lever 98 to rotate with the knob lever 98, and a second link 107 of which one end portion is connected to the super lock lever 105 and which extends to the side of the drive member 80 and the guide lever 106. The super lock mechanism 101 is accommodated in the operation chamber 72.

The super lock motor 102 operates to the side to release the connection between the knob lever 98 and the drive member 80 by, for example, carrying out a locking operation of the cylinder lock 21 twice within a set time so that the super lock motor 102 is fixedly supported by the case main part 69*b*. The worm wheel 104 and the super lock lever 105 are rotatably supported by the support shaft 108 supported by the case main part 69*b*. In addition, a spring not shown is provided between the worm wheel 104 and the case main part 69*b*, and the spring works to return the worm wheel 104 to the original position at the time of stopping the operation of the super lock motor 102.

The super lock lever 105 is provided with a long hole 109 in a circular arc shape with an axis of rotation of the drive member 80 as a center, and an engaging pin 110 provided at the drive member 80 is inserted through the long hole 109. A click spring 111 for moderately rotating the super lock lever 105 between a connection position shown in FIG. 8 and a connection released position rotated in the counterclockwise direction in FIG. 8 from the connection position, is provided between the super lock lever 105 and the case main part 69*b*.

One end portion of the second link 107 is connected to the super lock lever 105 via a connecting shaft 112, and an engaging pin 113 provided at the other end portion of the second link 107 is inserted through a first guide hole 114 provided in the guide lever 106, and a second guide hole 115 provided in the drive member 80. While the first guide hole 114 is formed to extend long along a radius direction with respect to the axis of rotation of the guide lever 106 and is provided at the guide lever 106, the second guide hole 115 is formed into a substantially L shape having a part extending along the radius direction with respect to an axis of rotation of the drive member 80 and a part extending from an inner end of the part to guide the engaging pin 113 around the axis of rotation when the drive member 80 rotates from the locked position to the unlocked position, and is provided in the drive member 80.

In such a super lock mechanism 101, the engaging pin 110 included by the drive member 80 only moves inside the long hole 109 included by the super lock lever 105 from one end side to the other end side when the drive member 80 rotates from the unlocked position to the locked position, and the rotating force from the drive member 80 does not act on the super lock lever 105. Further, the engaging pin 113 of the second link 107 is inserted through the first guide hole 114 of the guide lever 106 and the second guide hole 115 of the drive member 80. Thus, by the force which acts on the engaging pin 113 from the drive member 80 by rotation of the drive member 80 to the locked position from the unlocked position, the second link 107 is rotated in the counterclockwise direction in FIG. 8 with the connecting shaft 112 as the support point, and the knob lever 98 rotates to the locked position corresponding to the guide lever 106 rotating with the drive member 80.

Even if the lock operation knob 99 is operated to switch from the unlocked state to the locked state, the lock mechanism 22 and the super lock mechanism 101 operate as described above.

In the above locked state, when the super lock motor 102 is operated by, for example, carrying out the locking operation of the cylinder lock 21 twice within a set time, the super lock lever 105 rotates in the counterclockwise direction in FIG. 8. Thereby, the engaging pin 110 included by the drive member 80 only returns from the other end side to the intermediate portion inside the long hole 109 of the super lock lever 105, and the rotating force does not act on the drive member 80 from the super lock lever 105. The second link 107 rotates to move the engaging pin 113 along the first guide hole 114 of the guide lever 106, and the engaging pin 113 moves to the intermediate portion of the second guide hole 115 of the drive member 80.

In this super lock state, when the rotating force to the unlocking side acts on the knob lever 98 from the lock operation knob 99 via the push/pull cable 100 the knob lever 98 and the guide lever 106 rotate in the counterclockwise direction, and the engaging pin 110 inserted through the first guide hole 114 of the guide lever 106 also rotates with one end portion of the second link 107 as the center. However, the second guide hole 115 of the drive member 80 is formed into the shape which makes the engaging pin 110 strike at the air so as not to engage with the drive member 80 in the super lock state, and therefore, the rotating force is not transmitted to the drive member 80 from the knob lever 98. Namely, connection between the knob lever 98 and the drive member 80 is in the released state by the operation of the super lock mechanism 101.

When the door lock motor 75 is operated to the unlocking side in the super lock state, the drive member 80 rotates in the counterclockwise direction in FIG. 8, and thereby, the door lock lever 74 in the locked position rotates in the clockwise direction to be in the unlocked position. In this case, the first link 82 of which one end portion is connected to the door lock lever 74 also moves downward in FIG. 8, but the engaging pin 92 at the other end portion of the first link 82 only moves inside the long hole 91 of the key operation input lever 81, and thus, the first link 82 does not have influence on the key operation input lever 81. When the drive member 80 rotates to the unlocked position from the locked position, the engaging pin 110 included by the drive member 80 engages with the super lock lever 105 at one end side of the long hole 109 of the super lock lever 105, and the super lock lever 105 rotates in the clockwise direction. With this, the engaging pin 113 of the second link 107 is returned to the position shown in FIG. 8 through the first and second guide holes 114 and 115. The guide lever 106 rotates to the unlocked position side with the drive member 80, and the knob lever 98 is rotated to the unlocked position. In this case, the knob lever 98 and the drive member 80 are connected to each other with one of them made to follow the rotation of the other one to the locked position side.

Namely, when the knob lever 98 and the drive member 80 are in the disconnected state by the operation of the super lock mechanism 101, the drive member 80 is rotated to the unlocking side by the operation of the door lock motor 75, so that the knob lever 98 and the drive member 80 are brought into the connected state.

When the releasing operation of the cylinder lock 21 is performed in the operating state of the super lock mechanism 101, the key operation input lever 81 rotates in the clockwise direction in FIG. 8, and the engaging pin 92 engages with the key operation input lever 81 at one end side of the long hole 91 included by the key operation input lever 81, so that the door lock lever 74 rotates in the clockwise direction via the first link 82, whereby the door lock lever 74 in the locked position is brought into the unlocked position. When the door lock lever 74 is rotated to the unlocked position side, the engaging pin 110 included by the drive member 80 engages with the super lock lever 105 at one end side of the long hole 109 of the super lock lever 105, and the super lock lever 105 rotates in the clockwise direction. Also with this operation, the engaging pin 113 of the second link 107 returns to the position shown in FIG. 8 in the first and the second guide holes 114 and 115, the guide lever 106 rotates to the unlocked position side with the drive member 80, and the knob lever 98 also rotates to the unlocked position. Also with this operation, the knob lever 98 and the drive member 80 are in the state connected to each other in such a manner as to make one of them follow the rotation of the other one to the locked position side.

Namely, when the knob lever 98 and the drive member 80 are in the disconnected state by the operation of the super lock mechanism 101, the drive member 80 is rotated to the unlocked side by the releasing operation of the cylinder lock 21, whereby the knob lever 98 and the drive member 80 are in the connected state.

In this manner, the super lock mechanism 101 for preventing the door lock mechanism 22 from being in the unlocked state even if the lock operation knob 99 placed at the door D at the side facing the vehicle compartment in the locked state of the door lock mechanism 22, is constructed to be able to switch the state in which the connection between the knob lever 98 and the drive member 80 is released in response to the operation of the super lock motor 102 included by the super lock mechanism 101 and the state in which the knob lever 98 and the drive member 80 are connected in response to the operation of the drive member 80 to the unlock side when the knob lever 98 and the drive member 80 are in the disconnected state, and is accommodated in the housing case 69 connectively provided at the casing 66 of the door lock mechanism 22.

Accordingly, as compared with the one in which the super lock mechanism is placed apart from the door lock mechanism 22, it becomes possible to reduce the number of components, and it becomes also possible to simplify the management of the components on the assembly line, and the number of assembling steps for the door D can be reduced. In addition, even in the model which does not include the super lock mechanism 101, the housing case 69 can be used as it is by only excluding the components of the super lock mechanism 101.

An open lever 116 (see FIG. 2) is supported at the casing body 68 in the casing 66 of the door lock mechanism 22 to rotate in response to input of the door opening operation force. One end portion along the longitudinal direction of the open lever 116 projects from the casing body 68, and the operation force is inputted to the one end portion via a rod 117 in accordance with the operation of the outside handle 25 provided at the outer surface side of the door D (see FIG. 1). An input lever 120 which is rotated by a pulling operation of a cable 119 in response to the operation of an inside handle 118 (see FIG. 1) provided at the inner surface side of the door D, is rotatably supported at the cover 22 of the door lock mechanism 22, and the power in the door opening direction is transmitted to the open lever 116 from this input lever 120.

Figure 9:
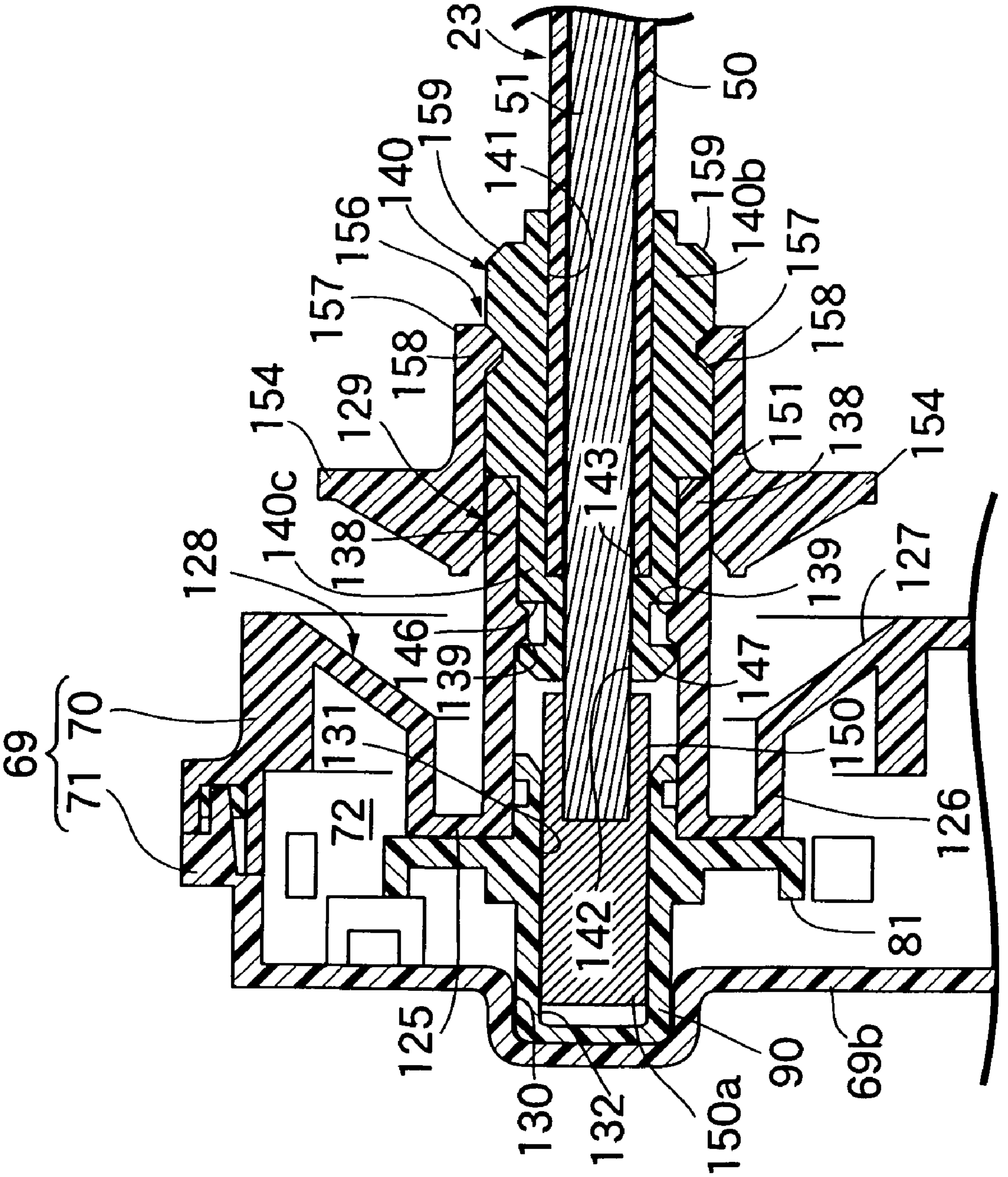
Figure 10:
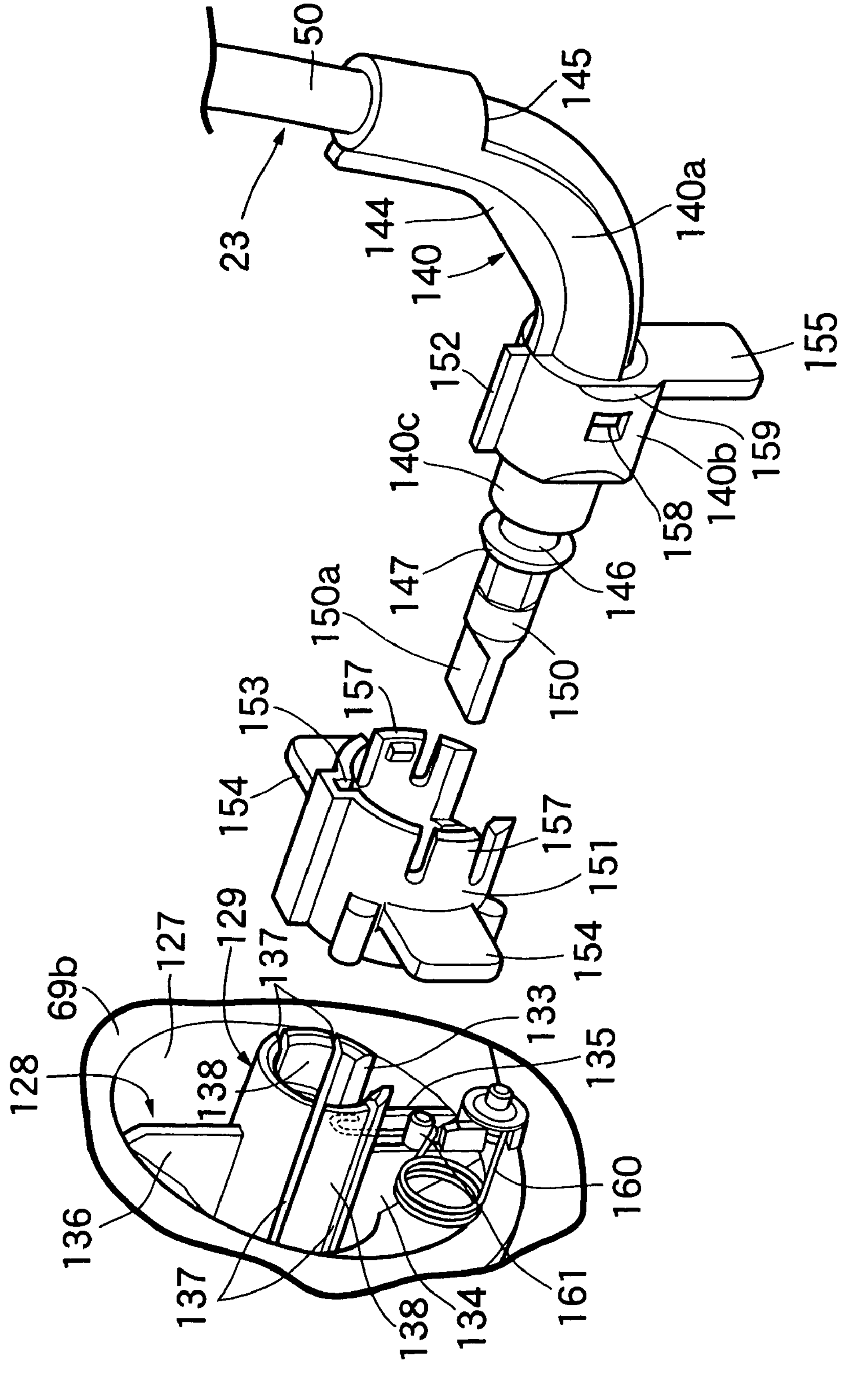

Referring also to FIG. 9 and FIG. 10, a sliding contact support part 125 in a circular plate shape which slides in contact with one surface of the key operation input lever 81, a cylindrical part 126 of which inner end is coaxially connected to an outer periphery of the sliding contact support part 125, and a taper part 127 of which small diameter end is coaxially connected to an outer end of the cylindrical part 126, are integrally provided at the side of the case half piece 70 at the lower portion of the case main part 69*b* so as to form a recessed part 128 which is recessed inwardly as a whole. A fitting cylindrical part 129 of which inner end is coaxially connected to a central part of the sliding contact support part 125 is integrally provided at the side of the case half piece 70 at the lower portion of the case main part 69*b* so that its outer end projects outward from the recessed part 128. Meanwhile, a support recessed part 130 coaxial with the fitting cylindrical part 129 is provided at the side of the case half piece 71 of the case main part 69*b*, and a key operation input shaft 90 integral with the key operation input lever 81 with one surface slid in contact with the inner surface of the sliding contact support part 125, has its one end portion fitted into an inner end portion of the fitting cylindrical part 129 and the other end portion fitted into the support recessed part 130, whereby the key operation input shaft 90 is rotatably supported at the case main part 69*b*.

The key operation input shaft 90 is provided with a fitting recessed part 131 which is opened at one end side of the key operation input shaft 90, and an engaging recessed part 132 which connects to an inner end of the fitting recessed part 131 along one diameter line of the key operation input shaft 90.

A notch 133 which extends in an axial direction is provided at a lower side wall of the fitting cylindrical part 129, and a pair of ribs 134 and 135 which sandwich the notch 133 from opposite sides are provided between a lower outer surface of the fitting cylindrical part 129 and an inner surface of the recessed part 128, and a rib 136 is provided between an upper outer surface of the fitting cylindrical part 129 and the inner surface of the recessed part 128 at the position corresponding to the central part between the opposite ribs 134 and 135.

Each pair of slits 137 and 137 which extend in the axial direction are provided at both left and right side walls of the fitting cylindrical part 129 so that engaging parts 138 and 138 which are elastically bendable in a radius direction of the fitting cylindrical part 129 are formed between the respective slits 137 and 137. Engaging projections 139 and 139 are provided to project at inner surface of intermediate portions of both the engaging parts 138 and 138.

A holder 140 made of a synthetic resin which holds the end portions of the inner cable 51 and the outer casing 50 at the side of the door lock mechanism 22 in a predetermined shape is mounted to the end portion of the outer casing 50 at the side of the door lock mechanism 22 in the torque cable 23.

The holder 140 integrally has a holder main part 140*a* curved in a circular arc shape, a holding part 140*b* which is connected to an end portion of the holder main part 140*a* at the side of the door lock mechanism 22 and formed to have a larger diameter than the holder main part 140*a*, and an engaging cylindrical part 140*c* which projects from the holding part 140*b* so as to be able to be fitted into an outer end portion of the fitting cylindrical part 129. A large diameter insertion hole 141 into which the end portion of the outer casing 50 at the side of the door lock mechanism 22 is inserted, and a small diameter insertion hole 142 which has a smaller diameter than the large diameter insertion hole 141 are provided at the holder 140 so as to form a step part 143 therebetween.

Thus, the outer casing 50 is inserted into the large diameter insertion hole 141 so that its end portion at the side of the door lock mechanism 22 abuts on the step part 143, and the inner cable 51 which projects from the end portion of the outer casing 50 at the side of the door lock mechanism 22 penetrates through the small diameter insertion hole 142 to project from the engaging cylindrical part 140*c* in the holder 140.

A reinforcing rib 144 is projectingly provided at an inner peripheral side of the holder main part 140*a*. An opening 145 for facilitating an insertion operation of the torque cable 23 into the holder 140 is provided at an outer peripheral side of the holder main part 140*a*.

An annular recessed locking part 146 is provided at an outer periphery near a tip end of the fitting cylindrical part 140*c* to be capable of elastically engaging with the engaging projections 139 and 139 included by both the engaging parts 138 and 138 of the fitting cylindrical part 129, and a taper surface 147 having a diameter decreasing forward is formed on an outer peripheral part of the tip end of the fitting cylindrical part 140*c*.

A cable end 150 is fixed to the end portion of the inner cable 51 which projects from the holder 140, and a tip end portion of the cable end 150 is crushed to be flat to form a flat engaging part 150*a* which engages with the engaging recessed part 132 of the key operation input shaft 90.

Figure 11:
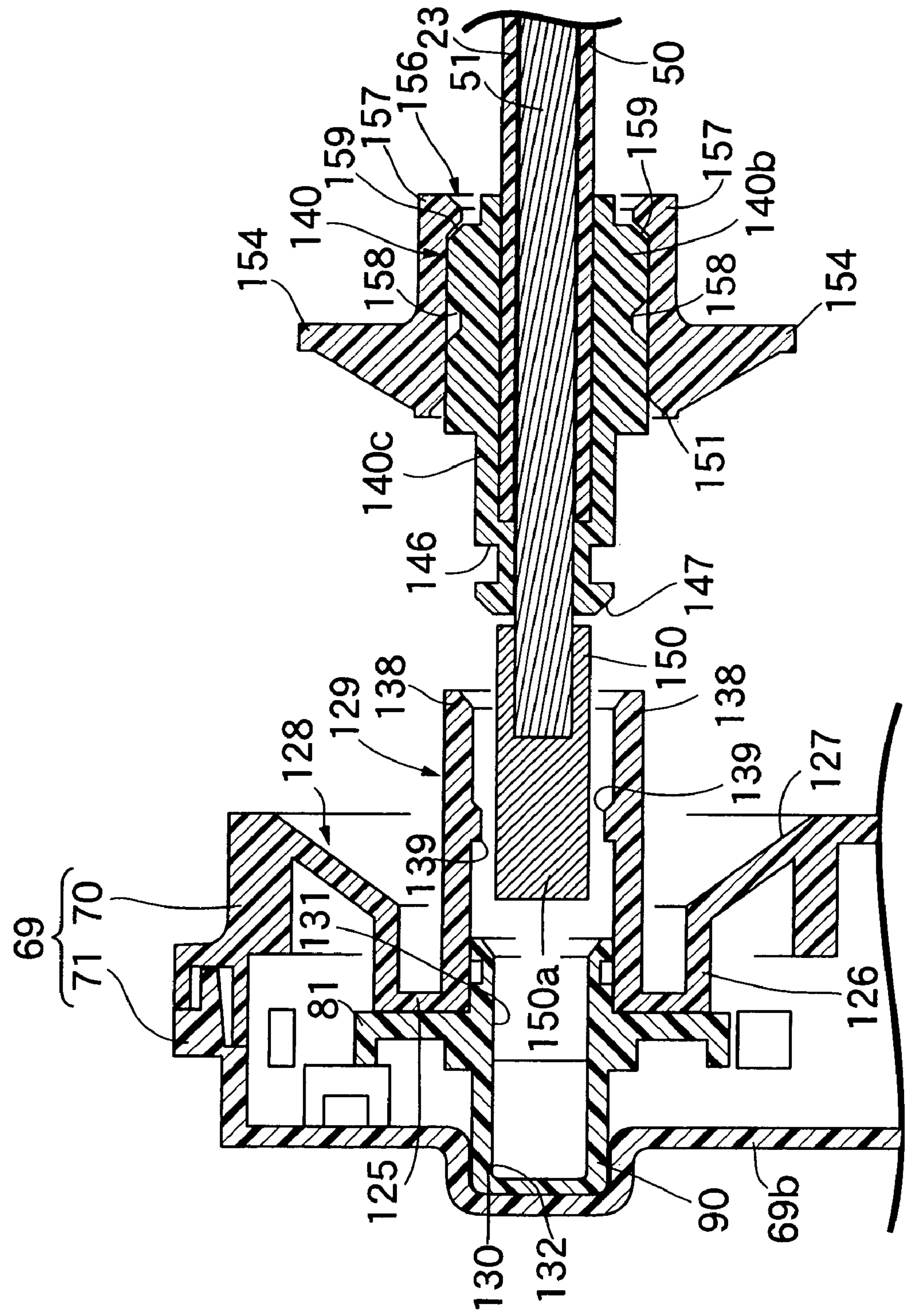

Thus, as shown in FIG. 11, when the cable end 150 is inserted into the fitting cylindrical part 129, and the engaging cylindrical part 140*c* of the holder 140 is fitted into the fitting cylindrical part 129, both the engaging parts 138 and 138 of the fitting cylindrical part 129 are expanded by the engaging projections 139 and 139 abutting on the taper surface 147 at the tip end of the engaging cylindrical part 140*c*, and when the taper surface 147 passes through both the engaging projections 139 and 139, the engaging projections 139 and 139 of both the engaging parts 138 and 138 elastically engage with the locking part 146 of the engaging cylindrical part 140*c* as shown in FIG. 9. In this case, the cable end 150 is fitted in the fitting recessed part 131 so that the flat engaging part 150*a* at its tip end engages with the engaging recessed part 132 of the key operation input shaft 90. In this state, the inner cable 51 makes twisting motion, whereby the key operation input shaft 90 and the key operation input lever 81 rotate.

An engagement release inhibiting member 151 capable of inhibiting release of engagement of the engaging parts 138 and 138 with the locking part 146 is fitted to the holding part 140*b* of the holder 140 to be capable of displacement between an engagement release allowing position which allows release of engagement and an engagement release inhibiting position which inhibits release of engagement.

The engagement release inhibiting member 151 is formed of a synthetic resin to be basically into a cylindrical shape to be capable of engaging with the fitting cylindrical part 129 in the state in which the engaging parts 138 and 138 are elastically engaged with the locking part 146, to keep the elastic engaging state of both the engaging parts 138 and 138 with the locking part 146. The holding part 140*b* of the holder 140 is also formed to have substantially the same outer diameter as the outer diameter of the fitting cylindrical part 129.

A ridge of guide projection 152 is provided to project at an outer surface of the holding part 140*b* in the holder 140, and a guide groove 153 in which the guide projection 152 is slidably fitted are provided in an inner surface of the engagement release inhibiting member 151. Therefore, when the engagement release inhibiting member 151 is fitted onto the holding part 140*b*, the relative position in the circumferential direction of the holding part 140*b*, namely, the holder 140 and the engagement release inhibiting member 151 is kept constant.

The engagement release inhibiting member 151 is integrally provided with, for example, a pair of operation parts 154 and 154 project to opposite sides for performing displacement operation of the engagement release inhibiting member 151 between the engagement release allowing position and the engagement release inhibiting position, and the holding part 140*b* of the holder 140 is integrally provided with an operation part 155 projecting downward to facilitate the operation when the engaging cylindrical part 140*c* of the holder 140 is pressed into the fitting cylindrical part 129.

Positioning holding means 156 is provided between the holding part 140*b* of the holder 140 and the engagement release inhibiting member 151, to position and hold the engagement release inhibiting member 151 at the engagement release allowing position and the engagement release inhibiting position.

This positioning holding means 156 is constructed by a pair of engaging claws 157 and 157 which are provided at the end portion of the engagement release inhibiting member 151 at a side opposite from the fitting cylindrical part 129, a pair of engaging recessed parts 158 and 158 which are provided at an outer periphery of the holding part 140*b* to elastically engage with both the engaging claws 157 and 157 when the engagement release inhibiting member 151 advances to the engagement release inhibiting position from the holding part 140*b* to be fitted onto the fitting cylindrical part 129, and a pair of locked surfaces 159 and 159 which are provided at an end portion of the holding part 140*b* at the side of the holder main part 140*a* so as to elastically engage with the both engaging claws 157 and 157 when the engagement release inhibiting member 151 returns to the engagement release allowing position which is retreated from the engagement release inhibiting position.

Figure 12:
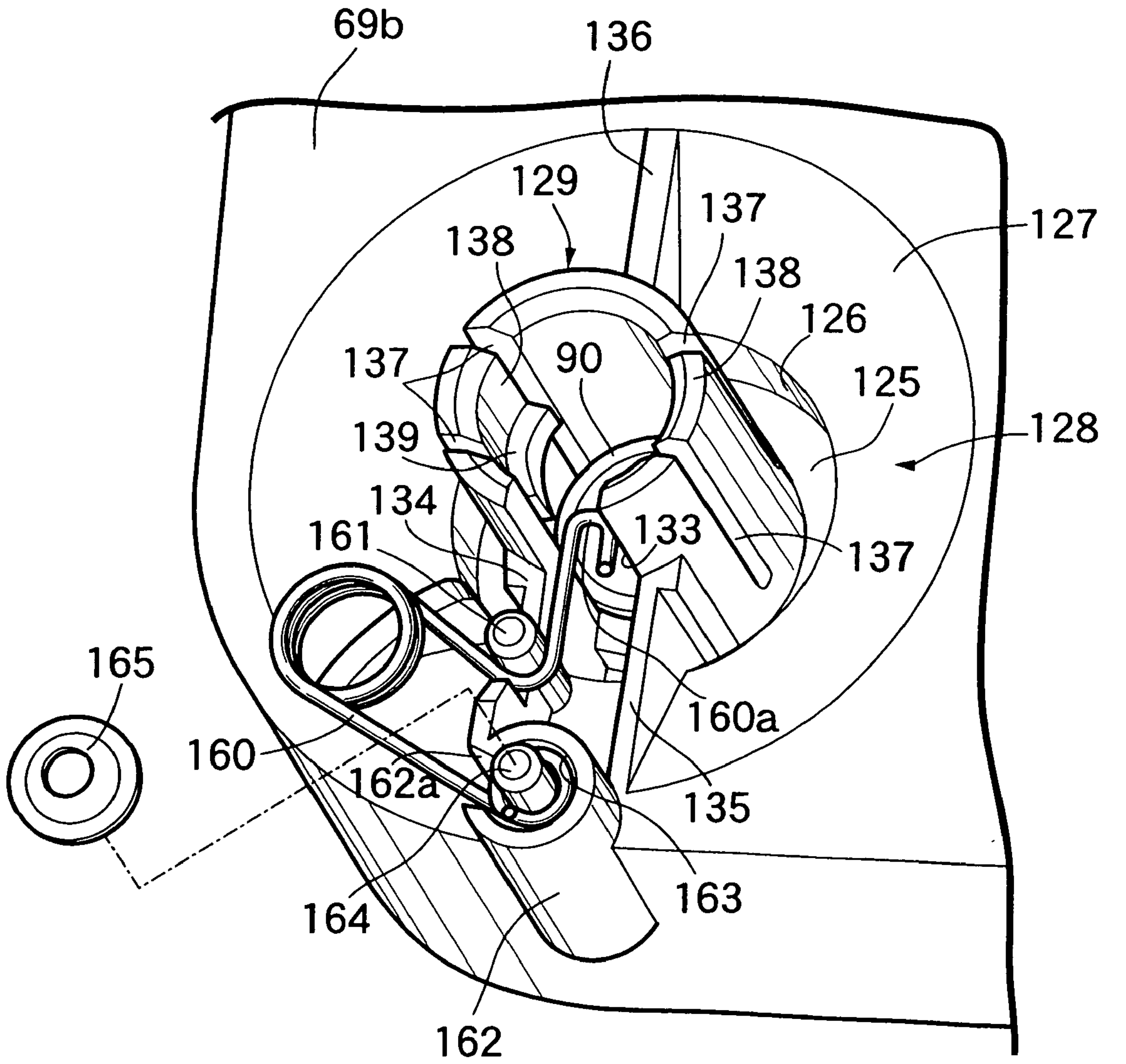

Referring also to FIG. 12, an insertion inhibiting member 160 which is displaceable so as to enter the fitting cylindrical part 129 from the notch 133 corresponding to disengagement of the engaging cylindrical part 140*c* from the fitting cylindrical part 129, is mounted to the case main part 69*b* in the casing 66 of the door lock mechanism 22.

The insertion inhibiting member 160 is made of an elastic material, and one end portion of the insertion inhibiting member 160 is fixed to the case main part 69*b*. Namely, a support boss 162 which extends parallel to the fitting cylindrical part 129 is integrally provided at the case main part 69*b* below the fitting cylindrical part 129. At a tip end portion of the support boss 162, an annular recessed part 163 is provided, and a support pin 164 surrounded by the annular recessed part 163 is integrally provided. Thus, one end portion of the insertion inhibiting member 160 is inserted through a notch 162*a* provided at the support boss 162, and inserted into the annular recessed part 163 to surround the support pin 164. In addition, an open end of the annular recessed part 163 is closed with a closing member 165 which is press-fitted to the support pin 164 with the one end portion of the insertion inhibiting member 160 inserted into the annular recessed part 163.

Therefore, the one end portion of the insertion inhibiting member 160 is fixed to the case main part 69*b*. The insertion inhibiting member 160 of which one end portion is in a fixed state exhibits an elastic force to make its other end portion enter the fitting projection part 129 from the notch 133, and the engaging part 160*a* which is bent in a substantially U-shape is formed at the other end portion of the insertion inhibiting member 160.

A pin-shaped position restricting part 161 which restricts the position of an engaging part 160*a* provided at the other end of the insertion inhibiting member 160, is projectingly provided at the rib 134 placed at one side of the notch 133 in the case main part 69*b*, and this position restricting part 161 is capable of engaging with an intermediate portion of the insertion inhibiting member 160.

Thus, in the state in which the position restricting part 161 engages the intermediate portion of the insertion inhibiting member 160, the position of the engaging portion 160*a* is restricted to the position at which it slightly projects into the fitting cylindrical part 129 from the notch 133, and when the engaging cylindrical part 140*c* of the holder 140 mounted onto the outer casing 50 is fitted into the fitting cylindrical part 129 in this state, the engaging part 160*a* is pushed outward with the taper surface 147 at the tip end of the engaging cylindrical part 140*c*, so that the engaging cylindrical part 140*c* is fitted into the fitting cylindrical part 129 to elastically engage the engaging parts 138 with the locking part 146. In addition, the engaging part 160*a* also engages with the locking part 146 in the state in which the engaging parts 138 elastically engage with the locking part 146 as shown in FIG. 7.

Figure 13:
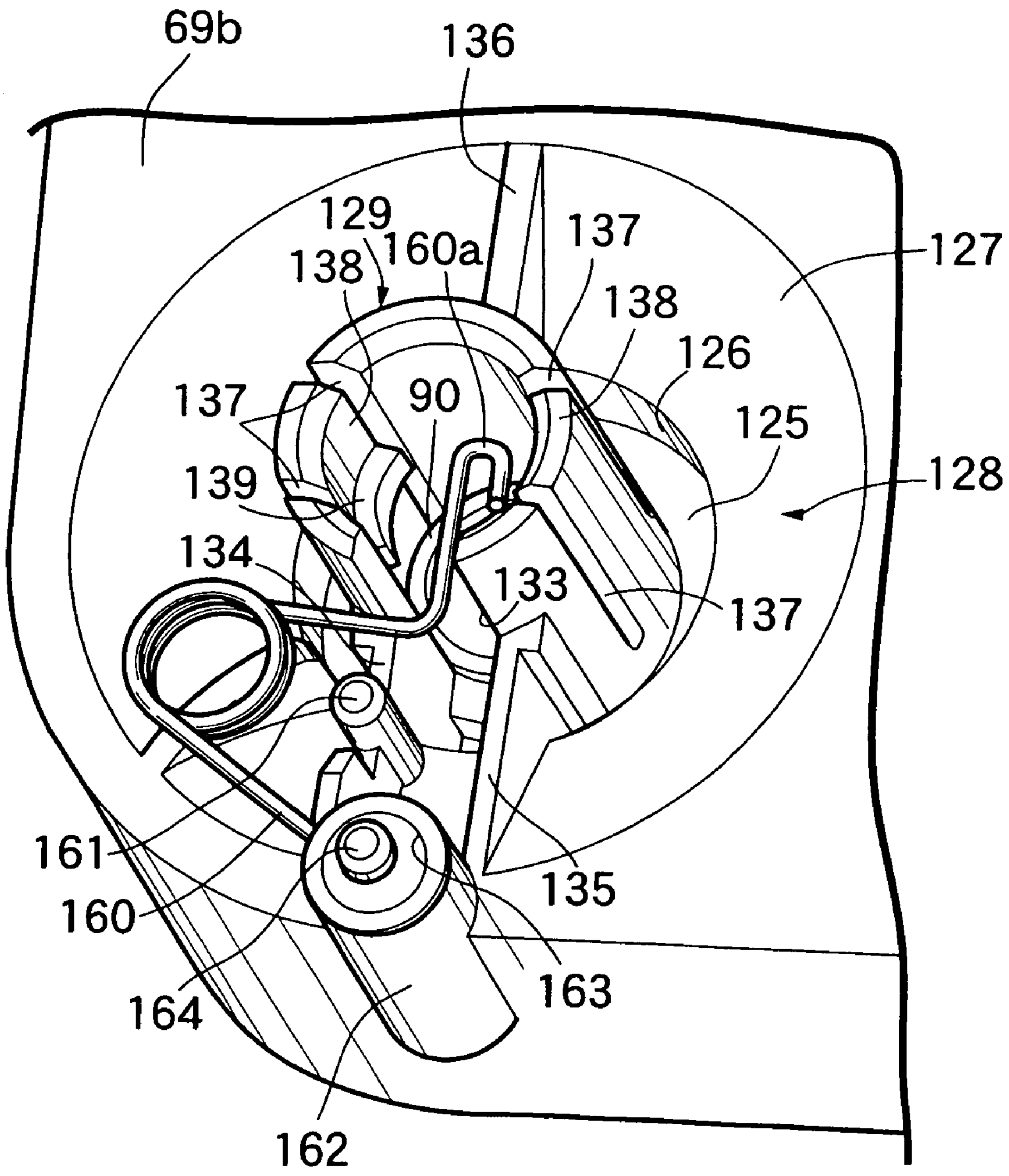

When the engaging cylindrical part 140*c* is pulled out of the fitting cylindrical part 129 by displacing the engagement release inhibiting member 151 to the engagement release allowing position to release the outer casing 50 from the fitting cylindrical part 129, the other end side of the insertion inhibiting member 160 is displaced outward in the axial direction of the fitting cylindrical part 129 along the notch 133 as shown in FIG. 13, because the engaging part 160*a* engages with the locking part 146. Therefore, the engagement of an intermediate portion of the insertion inhibiting member 160 with the position restricting part 161 is released, and the insertion inhibiting member 160 is in the displaced state so that its other end side deeply enters the fitting cylindrical part 129, and in this state, insertion of a tool or the like into the fitting cylindrical part 129 is inhibited.

Namely, the position restricting part 161 engages with the intermediate portion of the insertion inhibiting member 160 to restrict the position of the other end portion of the insertion inhibiting member 160 so as to allow the engaging cylindrical part 140*c* to be fitted into the fitting cylindrical part 129, and allows the displacement of the other end portion of the insertion inhibiting member 160 to the side entering the fitting cylindrical part 129 by releasing the engagement with the insertion inhibiting member 160 when the engaging cylindrical part 140*c* is disengaged from the fitting cylindrical part 129.

The operation of this embodiment will next be described. At the end portion of the outer casing 50 at the side of the door lock mechanism 22 in the torque cable 23, the locking part 146 capable of elastically engaging with the engaging parts 138 and 138 provided at the casing 66 of the door lock mechanism 22 is provided, and the engagement release inhibiting member 151 capable of inhibiting release of engagement of the engaging parts 138 and 138 with the locking part 146 is fitted to be capable of displacement between the engagement release allowing position which allows the release of engagement and the engagement release inhibiting position which inhibits the release of engagement.

Accordingly, when the inner cable 51 of the torque cable 23 is connected to the key operation input shaft 90 of the door lock mechanism 22, the engagement release inhibiting member 151 is placed at the engagement release allowing position, and the engaging parts 138 elastically engage with the locking part 146, whereby it is possible to connect the outer casing 50 through which the inner cable 51 is inserted to the door lock mechanism 22, and ease of assembling the inner cable 51 and the outer casing 50 to the door lock mechanism 22 side can be enhanced. In addition, by displacing the engagement release inhibiting member 151 to the engagement release inhibiting position, release of engagement of the engaging parts 138 and the locking part 146 is inhibited. Therefore, the outer casing 50 can be inhibited from being disengaged from the casing 66 of the door lock mechanism 22 in spite of an external force and shock action, and occurrence of the state in which it becomes impossible to manipulate the operation of the door lock mechanism 22 on the cylinder lock 21 side can be reliably prevented.

Since the holder 140 which keeps the end portions of the inner cable 51 and the outer casing 50 at the side of the door lock mechanism 22 in the predetermined shape is mounted to the end portion of the outer casing 50 at the side of the door lock mechanism 22, the operation of assembling the inner cable 51 and the outer casing 50 to the door lock mechanism 22 is facilitated, and occurrence of twist to the inner cable 51 and outer casing 50 due to the impact of opening and closing the door D can be prevented, thus restraining unwanted stress from acting on the connecting portions of the inner cable 51 and the outer casing 50 to the door lock mechanism 22.

The engagement release inhibiting member 151 is assembled to the holder 140 to be able to be displaced between the engagement release allowing position and the engagement release inhibiting position, and the holder 140 and the engagement release inhibiting member 151 are made into a unit. Therefore, management of the engagement release inhibiting member 151 is not complicated, and it becomes possible to displace the engagement release inhibiting member 151 to the engagement release inhibiting position easily and immediately after the outer casing 50 is connected to the casing 66 of the door lock mechanism 22.

In addition, the positioning holding means 156 which positions and holds the engagement release inhibiting member 151 at the engagement release allowing position and the engagement release inhibiting position respectively is provided between the holding part 140*b* of the holder 140 and the engagement release inhibiting member 151, and therefore, engaged and connected state of the outer casing 50 to the casing 66 can be reliably maintained.

The engagement release inhibiting member 151 is integrally provided with the operation parts 154 and 154 for operating the engagement release inhibiting member 151 to be displaced between the engagement release allowing position and the engagement release inhibiting position, and therefore, it becomes easy to operate the engagement release inhibiting member 151 to be displaced between the engagement release allowing position and the engagement release inhibiting position.

The casing 66 of the door lock mechanism 22 is integrally provided with the fitting cylindrical part 129 for fitting the engaging cylindrical part 140*c* provided at the end portion of the outer casing 50 at the side of the door lock mechanism 22 to connect the engaging cylindrical part 140*c* to the casing 66, and is also equipped with the insertion inhibiting member 160 which is capable of being displaced to enter the fitting cylindrical part 129 in response to the disengagement of the engaging cylindrical part 140*c* from the fitting cylindrical part 129. Therefore, even if the fitting cylindrical part 140*c* provided at the outer casing 50 is undesirably released from the fitting cylindrical part 129, the insertion inhibiting member 160 enters the fitting cylindrical part 129. Thus, even if a similar tool to the torque cable 23 is tried to be connected to the key operation input shaft 90 from the fitting cylindrical part 129, insertion of the tool into the fitting cylindrical part 129 is inhibited by the insertion inhibiting member 160, so that an improper rotational operation of the key operation input shaft 90 can be prevented.

The one end portion of the insertion inhibiting member 160 made of an elastic material exhibits the elastic force for causing the engaging part 160*a* at the side of its other end to enter the fitting cylindrical part 129 and is fixed to the casing 66, and the casing 66 is provided with the position restricting part 161 which engages with the intermediate portion of the insertion inhibiting member 160 to restrict the position of the other end portion of the insertion inhibiting member 160 to allow fitting of the engaging cylindrical part 140*c* into the fitting cylindrical part 129 so that the displacement of the other end portion of the insertion inhibiting member 160 to the side to enter the fitting cylindrical part 129 is allowed by releasing the engagement with the insertion inhibiting member 160 at the time of disengagement of the engaging cylindrical part 140*c* from the fitting cylindrical part 129. Therefore, when the engaging cylindrical part 140*c* which is provided at the outer casing 50 is disengaged from the fitting cylindrical part 129, the other end portion of the insertion inhibiting member 160 can be made to enter the fitting cylindrical part 129 with a simple structure.

The one end portion of the inner cable 51 is placed to be perpendicular to the axial line of the rotor 36 in the cylinder lock 21, the gear transmission mechanism 52 which transmits the rotating motion of the rotor 36 by converting it into the twisting motion of the inner cable 51 is interposed between the rotor 36 and the inner cable 51. Therefore, the structure which connects the inner cable 51 to the rotor 36 does not occupy a large space behind the cylinder lock 21, and it is not necessary to consider interference with the glass and the like which are placed behind the cylinder lock 21.

In addition, the gear transmission mechanism 52 is constructed by the face gear 53 coaxially connected to the rotor 36, and the pinion gear 54 which has the axial line perpendicular to the axial line of the face gear 53 and which is meshed with the face gear 53, and is accommodated in the gear case 40 mounted to the cylinder body 26 of the cylinder lock 21, and the pinion gear 54 is accommodated in the gear case 40 to be able to be displaced in the axial direction in the limited range while maintaining the meshed state with the face gear 53. Therefore, even if a variation occurs to the mounting position of the cylinder lock 21 and the door lock mechanism 22 to the door D, it is possible to absorb the variation by the displacement of the pinion gear 54 in the axial direction, and ease of assembling the torque cable 23 to the door lock mechanism 22 can be enhanced with the length of the torque cable 23 between the cylinder lock 21 and the door lock mechanism 22 substantially fixed at all times.

The fitting recessed part 57 relatively unrotatably fitting onto the rotor 36 is provided at the central portion of the face gear 53, and the projection part 58 which projects to the rotor 36 side is provided to project at the closed end of the fitting recessed part 57 with its surface in the curved surface shape. Therefore, even in the state in which the gear case 40 is disengaged from the cylinder body 26 and the connection of the face gear 53 and the rotor 36 is released, it is difficult to insert a tool or the like into the fitting recessed part 57 because the projection part 58 is placed inside the fitting recessed part 57 at the central portion of the face gear 53, and it is difficult to hold the projection part 58 because the surface of the projection part 58 is in the curved surface shape. Therefore, it is difficult to operate the face gear 53 to undesirably rotate, thereby enhancing an anti-theft effect.

The embodiment of the present invention is explained thus far, but the present invention is not limited to the above-described embodiment, and various design changes can be made without departing from the present invention described in the claims.

For example, in the above-described embodiment, the engagement release inhibiting member 151 is fitted to the holder 140 mounted to the outer casing 50, but the engagement release inhibiting member 151 may be fitted to the fitting cylindrical part 129 of the casing 66 included by the door lock mechanism 22.

What is claimed is:

1. An apparatus for locking and unlocking a vehicle door, the apparatus comprising a cylinder lock in which a rotor is rotatably supported within a cylinder body, the rotor rotating in response to a key operation of the apparatus, a door lock mechanism including a key operation input shaft, wherein the key operation input shaft rotates to switch the door lock mechanism between a locked state and an unlocked state of the door, and a torque cable for transmitting rotation of the rotor to the key operation input shaft, in which one end of the torque cable is connected to the rotor via a gear transmission mechanism, the gear transmission mechanism is accommodated in a gear case mounted to the cylinder body, wherein the gear transmission mechanism comprises a face gear and a pinion gear, the face gear is coaxially connected to the rotor, and the pinion gear is connected to the torque cable such that an axial line of the pinion gear lies perpendicular to an axial line of the face gear, and the pinion gear is meshed with the face gear, wherein the pinion gear is accommodated in the gear case so as to be capable of being substantially displaced in an axial direction of the pinion gear while maintaining a meshed state with the face gear, and wherein the apparatus further comprises a fitting recessed part provided at a central part of the face gear, wherein the rotor is fitted within the fitting recessed part so as to be incapable of rotation relative to the fitting recessed part, and a projection projecting toward the rotor is projectingly provided at a closed end of the fitting recessed part, the projection comprising a surface having a curved shape.

2. The apparatus for locking and unlocking a vehicle door according to claim 1, wherein the face gear comprises a plurality of face gear teeth each having a radial length, and wherein the pinion gear is displaceable relative to the face gear to an extent greater than the radial length of one of said face gear teeth.

3. An apparatus for locking and unlocking a vehicle door, the apparatus comprising a cylinder lock in which a rotor is rotatably supported within a cylinder body, the rotor rotating in response to a key operation of the apparatus, a door lock mechanism including a key operation input shaft, wherein the key operation input shaft rotates to switch the door lock mechanism between a locked state and an unlocked state of the door, and a torque cable for transmitting rotation of the rotor to the key operation input shaft, in which one end of the torque cable is connected to the rotor via a gear transmission mechanism, the gear transmission mechanism is accommodated in a gear case mounted to the cylinder body, wherein the gear transmission mechanism comprises a face gear and a pinion gear, the face gear is coaxially connected to the rotor, and the pinion gear is connected to the torque cable such that an axial line of the pinion gear lies perpendicular to an axial line of the face gear, and the pinion gear is meshed with the face gear, wherein the pinion gear is accommodated in the gear case so as to be capable of being substantially displaced in an axial direction of the pinion gear while maintaining a meshed state with the face gear, and wherein the pinion gear comprises a pinion gear shaft, the pinion gear shaft is formed integrally on a surface of the pinion gear opposed to the torque cable, and the pinion gear shaft is slidably fitted in a support hole provided in the gear case.

4. The apparatus for locking and unlocking a vehicle door according to claim 3, wherein the face gear comprises a plurality of face gear teeth each having a radial length, and wherein the pinion gear is displaceable relative to the face gear to an extent greater than the radial length of one of said face gear teeth.

* * * * *